US008626945B2

(12) United States Patent
Lindemann et al.

(10) Patent No.: US 8,626,945 B2
(45) Date of Patent: Jan. 7, 2014

(54) METHOD FOR TRANSPARENTLY EXCHANGING DATA PACKETS

(75) Inventors: Werner Lindemann, Mülheim (DE); Norbert Schönfeld, Dortmund (DE)

(73) Assignee: Siemens Enterprise Communiucations GmbH & Co. KG, Munich (DE)

( * ) Notice: Subject to any disclaimer, the term of this patent is extended or adjusted under 35 U.S.C. 154(b) by 2037 days.

(21) Appl. No.: 10/529,334

(22) PCT Filed: Jul. 31, 2003

(86) PCT No.: PCT/DE03/02583
§ 371 (c)(1),
(2), (4) Date: Mar. 24, 2005

(87) PCT Pub. No.: WO2004/030317
PCT Pub. Date: Apr. 8, 2004

(65) Prior Publication Data
US 2006/0080458 A1    Apr. 13, 2006

(30) Foreign Application Priority Data
Sep. 25, 2002 (DE) .................. 102 44 612

(51) Int. Cl.
*G06F 15/173* (2006.01)
(52) U.S. Cl.
USPC .......................... 709/238; 709/239
(58) Field of Classification Search
USPC ................... 709/237, 238; 370/469
See application file for complete search history.

(56) References Cited

U.S. PATENT DOCUMENTS 6,381,646 B2 *   4/2002   Zhang et al. ................. 709/227
6,636,505 B1 *  10/2003   Wang et al. .................. 370/352

(Continued)

FOREIGN PATENT DOCUMENTS

| DE | 100 14 090 A1 | 11/2001 |
| EP | 0 887 738 A1 | 12/1998 |
| WO | WO 01/71977 A2 | 9/2001 |
| WO | WO 02/15494 A1 | 2/2002 |

OTHER PUBLICATIONS

M. Holdrege and P. Srisuresh, "Protocol Complications with the IP Network Address Translator", Network Working Group, Jan. 2001, Internet: URL:http//www.faqs.org/ftp/rfc/pdf/rfc3027.txt.pdf, pp. 1-20.

*Primary Examiner* — Ninos Donabed
(74) *Attorney, Agent, or Firm* — Buchanan Ingersoll & Rooney PC

(57) ABSTRACT

The invention relates to a method for transparently exchanging data packets with a packet-oriented network, via which a number of network elements and a network node device are connected based on a common access method. The network elements are allocated unique local addresses only within the network. The network node device connects the packet-oriented network to an external device based on a point-to-point protocol and performs an address conversion of the address of a network element, said address being allocated within the packet-oriented network, into an address valid for the external device. A verification of message header entries of the data packets exchanged between the external device and the network element permits the establishment of a temporary transparent connection of the network element to the external device in the event an entry is detected the characterizes an expanded point-to-point protocol, e.g. PPPoE, whereby the address newly allocated by the external device is transmitted to the external device without address conversion.

22 Claims, 1 Drawing Sheet

(56) References Cited

U.S. PATENT DOCUMENTS

| | | | |
|---|---|---|---|
| 6,778,525 B1 * | 8/2004 | Baum et al. | 370/351 |
| 6,829,250 B2 * | 12/2004 | Voit et al. | 370/467 |
| 7,058,059 B1 * | 6/2006 | Henry et al. | 370/395.1 |
| 7,099,944 B1 * | 8/2006 | Anschutz et al. | 709/227 |
| 7,107,360 B1 * | 9/2006 | Phadnis et al. | 709/250 |
| 7,170,905 B1 * | 1/2007 | Baum et al. | 370/467 |
| 7,171,491 B1 * | 1/2007 | O'Toole et al. | 709/244 |
| 7,228,358 B1 * | 6/2007 | McManus | 709/239 |
| 7,353,280 B2 * | 4/2008 | Chiles et al. | 709/228 |
| 7,379,475 B2 * | 5/2008 | Minami et al. | 370/469 |
| 7,383,339 B1 * | 6/2008 | Meenan et al. | 709/227 |
| 7,428,585 B1 * | 9/2008 | Owens et al. | 709/223 |
| 2001/0034759 A1 * | 10/2001 | Chiles et al. | 709/203 |
| 2002/0002621 A1 | 1/2002 | Zhang et al. | |
| 2002/0129165 A1 | 9/2002 | Dingsor et al. | |
| 2003/0167405 A1 * | 9/2003 | Freund et al. | 713/201 |
| 2003/0236916 A1 * | 12/2003 | Adcox et al. | 709/245 |
| 2004/0044789 A1 * | 3/2004 | Angel et al. | 709/238 |

\* cited by examiner

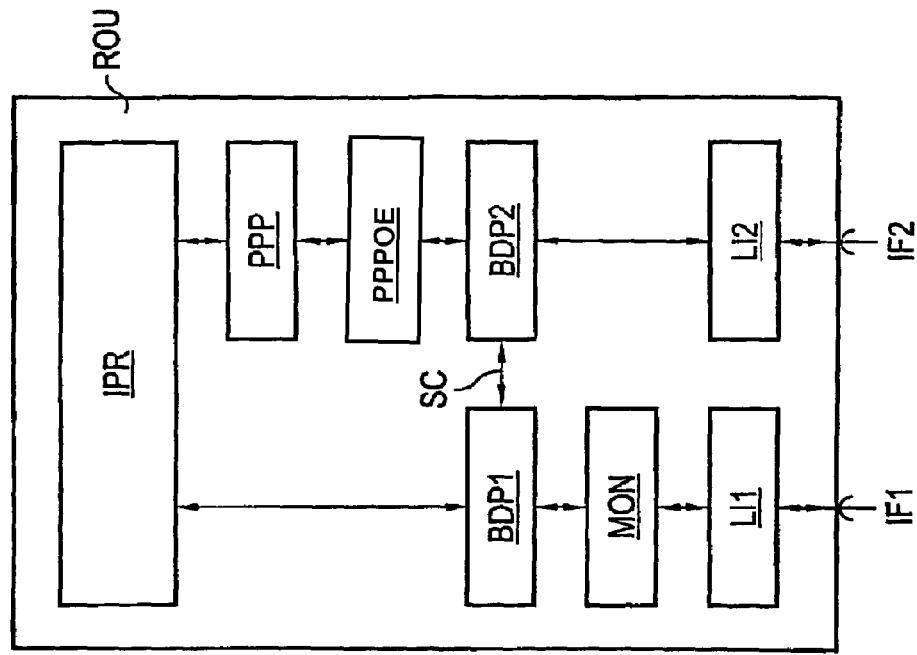
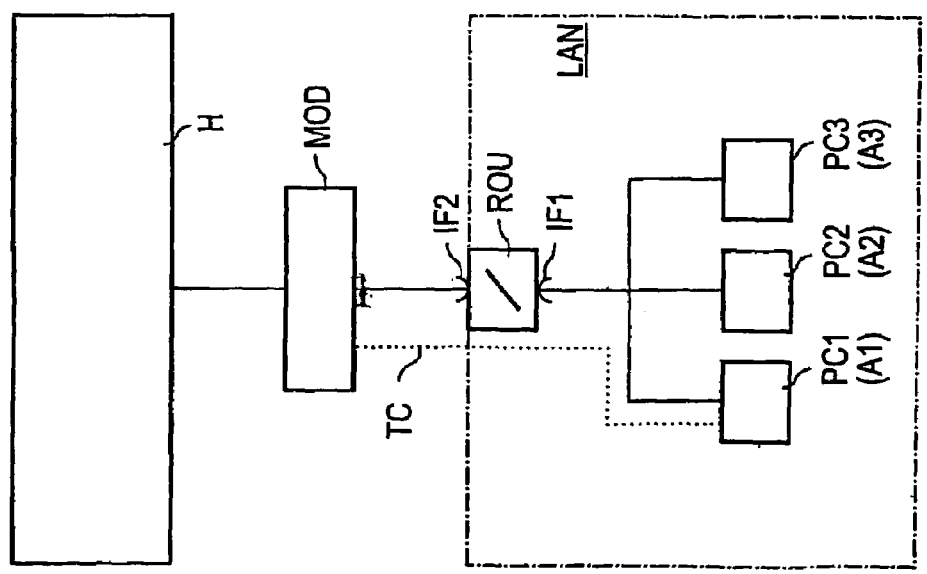

METHOD FOR TRANSPARENTLY
EXCHANGING DATA PACKETS

CROSS REFERENCE TO RELATED APPLICATIONS

This application is the U.S. National Stage of International Application No. PCT/DE2003/002583, filed Jul. 31, 2003 and claims the benefit thereof. The International Application claims the benefits of German application No. 10244612.1 filed Sep. 25, 2002, both applications are incorporated by reference herein in their entirety.

FIELD OF THE INVENTION

The invention relates to a method and an arrangement for transparently exchanging data of a network element arranged in a packet-oriented network with a network-external device, as required, via a network node element.

SUMMARY OF THE INVENTION

Modern communication protocols in packet-oriented networks, e.g. the Internet protocol IP, use a destination address for the addressing of network elements and for the route definition—also known by the technical term "routing"—of the data packets between the origin and destination. This address is formed for the Internet protocol IP from an IP address and a UDP or TCP port number (User Datagram Protocol or Transmission Control Protocol). For the sake of simplicity, the term network element address is used below to refer to the IP address in combination with the relevant port number. This type of addressing simplifies global communication and accessibility, yet requires a large number of globally unique addresses.

For this reason, processes are often used for reducing the number of global addresses required for worldwide communication. One possibility is the allocation of private addresses, i.e. which are unique in the local area only and are therefore only locally valid in local networks, also known as LANs (Local Area Networks).

For communication with communication partners outside the local network, the local addresses must be converted into other local or global addresses. This process of address conversion is known by the technical terms NAT (Network Address Translation) or NPAT (Network and Port Address Translation). Both conversion processes are defined, for example, in the document RFC 1631 (Request for Comment) by the IETF (Internet Engineering Task Force).

For the routing of data packets, the addresses of the local network are converted to publicly registered (i.e. global) addresses using address conversion processes.

A special form of address conversion exists whereby the addresses of all network elements in the packet-oriented network are converted to a single address. This enables the addresses of one or more network elements to be concealed—in a process also known by the technical term "masquerading"—in which a packet-oriented network is outwardly represented by just a single address, for example.

Network elements—e.g. networked computer systems such as workplace computers—which communicate with one another only within the LAN, do not require allocation of global addresses for LAN-internal data communication. A communication with a network element outside the LAN—in particular on the Internet—whereby said network element establishes a localized end point, is allocated a global address on the basis of an allocation table via a reserved network element referred to below as a network node device. The functions of such a network node device are handled mainly by a router provided for this purpose, or even by a computer system used for network administration, also known as proxy servers or gateways. For the sake of simplicity, the term "router" is used below to mean all network node devices of this type.

Such routers are equipped with specialized functions, depending on the composition—with regard to topography, communication protocols, and access processes—of the networks to be connected. Routers that connect a LAN to a data communication service provider are considered below. The provider generally allocates to the connected network node device, for the duration of a communication connection, a global address via which connection requests of network elements from the LAN are handled by means of the aforementioned address conversion process.

Where appropriate, the provider is also referred to as an "external device" in order to highlight its topographical aspect as the end point of a point-to-point communication with the router. The term data communication is used to describe the exchange of packet-oriented data, which—for example—is used for computer-aided data exchange or even data exchange by communication devices.

A connection to the provider's network is possible using a variety of access options. For reasons of clarity, an access based on a point-to-point communication protocol—abbreviated to PPP—is explained below by way of example. The PPP facilitates the exchange of data via synchronous and asynchronous dial-up or dedicated lines and operates independently of the physical interface being used, provided a transparent, fully duplex-compatible line is available.

By way of expansion of the PPP protocol, a protocol is described by the IETF in document RFC 2516 that enables PPP sessions to be conducted via a transmission medium—in particular the so-called Ethernet—with one access for multiple communication partners, whereby PPP data packets are encapsulated in Ethernet frames. This protocol is referred to below as PPPoE (PPP over Ethernet). The expanded packet-oriented protocol PPPoE permits logical point-to-point connection via the otherwise connectionless medium of Ethernet.

A data packet according to the IP (Internet protocol) is converted into a data packet according to the PPPoE protocol, whereby the so-called IP datagram—the original IP data packet—is provided with a PPP header and a PPPoE header. The data packet is then encapsulated in an Ethernet frame for transmission via the LAN.

An exemplary embodiment for a data connection using the PPPoE protocol is provided, for example, by a LAN formed from several workplace computers and a router, whereby data packets can be exchanged between the workplace computers and the router both according to the PPPoE protocol and also using the Internet protocol. The data of both potential protocols mentioned above is transported over Ethernet as data packets, for which purpose the data is encapsulated into a so-called Ethernet frame which is forwarded by the router to a modulation/demodulation device (abbreviated to modem) connected to it.

The modem modulates these data packets into a data stream and forwards this to the provider, e.g. via a fixed communication link. The reverse procedure from the provider is effected in similar fashion with demodulation of the data stream into data packets.

A PPPoE communication connection as described above is used, in particular, in an xDSL data line (Digital Subscriber Line, with "x" standing for different variants such as—for example—Asymmetrical DSL (ADSL), or Symmetric Bitrate (SDSL)).

In the application mentioned, address conversion as mentioned above also has the advantage that several workplace computers having different IP addresses that are valid only within a LAN, are involved in the data communication via a single IP address of the router. This IP address is normally allocated by the provider for the relevant data communication session.

The address conversion is normally carried out by the router within the IP layer, which—in the widest sense—is localized on layer 3 of the ISO/OSI layer model (International Standardization Organization, Open Systems Interconnection). This address conversion produces problems resulting in restrictions to the use of various applications. Some of these problems are described briefly below.

Problems occur when an exchange of IP and/or port addresses in superordinate protocol layers is required by applications—such as, for example, "active ftp" or "Netmeeting"—or by specifications. Since conventional routers do not process these protocol layers, a conflict occurs in the unique address allocation.

A further problem arises if an incoming connection at a network element, i.e. at its so-called logical port, is to be set up within the LAN, if this was not based on an outgoing connection setup on the same port. In this case the router is unable to identify, from the received port address, the network element that is to be addressed within the LAN. Server operation of a network element localized in the LAN is therefore not easily achievable.

Certain applications based on a PPPoE driver in a network element of the LAN cannot be used if the router does not offer a PPPoE protocol going toward the LAN.

The object of the invention is to specify an arrangement and a method, the application of which results in the above problems being avoided.

This object is achieved by the claims.

A packet-oriented network comprising a number of network elements is connected via a network node device with an external device, for example a so-called Internet Service Provider (ISP). While a connection is being set up between a first network element and the external device, this process generally being accompanied by the transmission of a user name—and password, if applicable—to the external device, an address to be used for the connection is obtained from the external device by the first network element or the network node element. In particular, this network element address is an Internet Protocol address (IP address). The previously allocated address, which is valid only within the packet-oriented network—the local address—of the first network element, is overwritten during the connection setup, e.g. with the address obtained from the external device.

According to the invention, the message header entries of the data packets exchanged between the external device and the network element are verified. If an expanded packet-oriented protocol is detected in the characterizing entry of a data packet, a temporarily transparent connection is set up between the corresponding network element and the external device, whereby the address transferred from the external device to the network node device is used instead of the address allocated to the network element in the packet-oriented network. A communication protocol according to PPPoE (Point-to-Point Protocol over Ethernet), for example, is used as an expanded packet-oriented protocol.

One main advantage of the method according to the invention is apparent in that a "transparent" connection is automatically effected as required. This eliminates the need for previously used methods, such as the elaborate protocol analyses of higher protocol layers within the communication protocol that takes place in the network node device, e.g. using a so-called "Application Level Gateway", which is described in the documents RFC 3027 or RFC 3022.

In a transparent connection, the PPPoE protocol is used for communication between the network element involved and the external device, rendering address conversion in the network node device unnecessary. Instead, the network element uses the address that was obtained during the connection setup from the external device and forwards it, unchanged, via the network node device to the external device.

It is possible, advantageously, for a transparent connection to be set up by any network element within the packet-oriented network. The network node device therefore does not—as used to be the case—need to route data packets of incoming connections to "new" port addresses to a permanently configured computer system. Such configurations, which are known in the prior art, are also known as "exposed machines".

It is therefore possible, advantageously, for a PPPoE driver to be used in a network element despite the use of a route-determining network node device, in particular a router. In this way, services of the external device—in particular of a so-called ISP (Internet Service Provider)—which are dependent on a subscriber logging into the network element, can be used advantageously.

The network element, which is connected to the external device via a transparent connection, can easily be operated, advantageously, as a server.

In addition to a maximum number of transparent connections, said maximum number usually being defined by the external device, it will still be possible—advantageously—for "conventional" connections to the remaining network elements—i.e. connections implemented with address conversion and routing—to be handled.

Advantageous developments of the invention are described in the dependent claims.

A verification is carried out—advantageously—before the transparent connection for a network element is established, to determine whether a transparent connection of the same type exists for at least one other network element. Such a maximum number of transparent connections and/or "conventional" connections—see above—depends, for example, on the specifications of the external device.

The transparent connection is terminated, advantageously, as soon as a connection release request—also known by the technical term PPPoE Active Discovery Terminate process—is detected. A communication release request of this type is transmitted in a characterizing entry, for example by a data packet with reserved structure (also known as a connection control element).

A connection release request of this type is also triggered, advantageously, when a predefined period during which no data packets have been exchanged according to the expanded packet-oriented protocol, has been exceeded (this is also known by the technical term "timeout"). A measure of this kind prevents any transparent connections from being occupied if a connection control element transporting the connection release request is not received due to a transmission error.

An exemplary embodiment of the invention is described in greater detail below with the help of the diagrams.

BRIEF DESCRIPTION OF THE DRAWINGS

FIG. 1: is a structural diagram that schematically illustrates a data communication connection between a packet-oriented network and an external device, and FIG. 2: is a structural diagram that schematically illustrates a network node device according to the invention.

DETAILED DESCRIPTION OF THE INVENTION

FIG. 1 is a packet-oriented network LAN showing a first network element PC1, a second network element PC2 and a third network element PC3.

The network elements PC1, PC2, PC3 are connected to one another and to a network node device ROU via a common transmission medium, for example an Ethernet. The network node device ROU has a first network interface IF1 for connection to the packet-oriented network LAN, and a second network interface IF2, which connects the network node device ROU to an input of a modulation/demodulation device MOD—also known as a modem. Data is exchanged between the second network interface IF2 and the input to the modem MOD on a packet-oriented basis, just as in the packet-oriented network LAN.

In an alternative embodiment, modulation/demodulation functions are integrated into the network node device ROU, which means that use of the modem MOD is no longer required.

The network node device ROU is implemented, for example, as a router or, alternatively, as a gateway or a proxy server.

The modem MOD is connected to an external device H. The connection of the modem MOD to the external device H is effected, for example, via a permanently allocated telecommunications line.

Furthermore, the method according to the invention is not limited to a physical transfer process. Possible alternatives to a permanently assigned telecommunications line include, for example, embodiments using ATM (Asynchronous Transfer Mode) or radio link techniques.

Each respective network element PC1, PC2, PC3 has a corresponding local address A1, A2, A3, i.e. one that is unique only within the packet oriented network LAN, allocated to it within the packet-oriented network LAN. The allocation of the respective addresses A1, A2, A3 to the respective network element PC1, PC2, PC3 is effected dynamically, for example, via a master computer or server (not shown), or is even permanently set on a network card (not shown), which is allocated to the respective network element PC1, PC2, PC3. The protocol DHCP (Dynamic Host Configuration Protocol), for example, is used for the dynamic allocation of the respective addresses A1, A2, A3.

An address (not shown) has generally been allocated, in turn, to the network node device ROU during a connection setup, said address being unique and/or valid in the connected network (not shown) of the external device H.

The communication of the network elements PC1, PC2, PC3 with one another and with the network node device ROU is effected within the packet-oriented network LAN via data packets, e.g. in the form of so-called Ethernet frames. An Ethernet frame of this type consists of an Ethernet message header entry, also known as the "header", and a checksum field. The Ethernet message header entry and the checksum field of a data packet of this type enclose a datagram, which is described in greater detail below.

In the case of communication according to the Internet Protocol (IP), the corresponding Ethernet frame contains an IP diagram, which is characterized by an IP message header entry. If communication takes place according to the PPPoE protocol (Point-to-Point Protocol over Ethernet), the datagram encapsulated in the Ethernet frame contains a PPPoE datagram, which is characterized by a PPPoE message header entry. The PPPoE datagram, in turn, contains a datagram according to the PPP protocol (Point-to-Point Protocol) with a corresponding PPP message header entry. The PPPoE datagram furthermore contains a user data entry, which in turn contains an IP datagram with the aforementioned structure.

The following is based on a communication from the external device H via the modem MOD and via the network node device ROU, with network elements PC1, PC2, PC3 of the packet-oriented network LAN. These network elements PC1, PC2, PC3 communicate, in a first stage, with the switched network node device ROU according to the Internet protocol. In order to address a respective network device PC1, PC2, PC3, the network node device ROU performs an address conversion—also known as Network Address Translation or NAT—between the address allocated by the external device H, particularly in the form of an Internet Protocol address or IP address, and the respective address A1, A2, A3 which is valid only in the packet-oriented network LAN.

In a second stage, it is assumed that the first network element PC1 modifies the communication protocol, i.e. now initiates a PPPoE communication connection instead of the Internet protocol. The network node device ROU detects this change in a manner yet to be described, and then sets up a transparent connection TC—symbolized in the diagram by a dotted line. For the sake of clarity the dotted line symbolizing the transparent connection TC is shown in the diagram as merely running alongside the network node device ROU. In fact, this transparent connection TC is effected with the active involvement of the network node device ROU.

In order to establish the transparent connection TC, addresses that uniquely identify respective network interfaces (not shown) of the first network element PC1 or of the network node device ROU, are taken into account and/or modified.

One address of this type, which uniquely identifies the respective network interface, is known as a MAC (Media Access Control) address. The MAC address is an unalterable hardware address used for the globally unique identification of a node (e.g. hardware address of a network interface).

The network node device ROU receives data packets from the first network element PC1 at the first network interface IF1, which connects the network node device to the packet-oriented network LAN. Characterizing message header entries of the data packets transmitted from the first network element PC1 have the MAC address of the first network element PC1, as the original MAC address, and the MAC address of the first network interface IF1 of the network node device ROU, as the destination MAC address. The network node device ROU transfers these data packets internally to a second network interface IF2 that connects the network node device ROU to the external device H, whereby a modification to the original or destination MAC addresses is carried out beforehand. The MAC address of the external device H to be used as the destination was transmitted to the network node device ROU during the connection setup between the first network element PC1 and the external device H, whereby this MAC address has been stored by the transmitting network node device ROU. The network node device ROU sets the MAC address of the second network interface IF2 as the original MAC address and the MAC address of the external device H—which was previously stored—as the destination MAC address. For data packets transmitted from the external device H, the procedure is reversed accordingly for the respective MAC addresses.

When the transparent connection TC is set up, the first network element PC1 is allocated a new address A1 (IP address) by the external device H. This new address overwrites the previously valid address A1.

In order to control the transparent connection TC, a so-called "Session ID", which uniquely identifies the data connection layer ("Session") of the transparent connection TC, is agreed in addition between the external device H and the first network device PC1.

The PPPoE protocol is used for communication between the first network element PC1 and the external device H on the basis of the transparent connection TC, whereby an address conversion by the network node device ROU is no longer required. Instead, the address A1 of the network element PC1 obtained during the connection setup (see above) of the transparent connection TC is forwarded, unchanged, via the modem MOD to the external device H.

If the setup of the transparent connection is initiated by the first network element PC1, for example, the data exchange is effected via a PPPoE driver (not shown) in the first network element PC1. The transparent connection TC is effected bidirectionally, i.e. return packets from the external device H are also transmitted to the first network element PC1, via the network node device ROU, without address conversion or protocol conversion.

The network node device ROU detects, on the basis of the PPPoE message header entries, an existing transparent connection TC and initiates the release of the transparent connection TC, possibly on the basis of reserved protocol elements—also known as connection control elements—such as for example a connection release request. In addition to a dedicated connection release request by a connection control element, an event ("timeout") is also triggered by the network node device ROU as soon as there is no exchange of data packets taking place according to the PPPoE protocol over a predefined period. The network node device ROU terminates the data connection ("session") with this event on the basis of the transparent connection TC. Upon termination of the transparent connection TC of the first network element with the external device H, a transparent connection (not shown) with the external device H can be set up for the network-elements PC1, PC2, PC3.

The management of communication connections between the network elements PC1, PC2, PC3 with the external device H is explained below in a further embodiment. External devices H, such as—for example—an Internet provider, often support only a limited number of simultaneous connections, in this case from the packet-oriented network LAN.

For example, if the provider supports only one PPPoE connection, then other existing transparent communication connections according to the PPPoE protocol are liable to be interrupted in order to make exclusive communication access available to the network element PC1 in question for the duration of a transparent connection TC.

If the network element PC1 wishes to set up a transparent connection TC to the external device H, while the second network element PC2 is already conducting a transparent connection of this type (not shown), the exclusive access must be protected by means of a transparent connection TC of the first network element. This is one example of a priority rule according to the so-called "first come first served" principle—as implemented, for example, in the network node device ROU. If a larger number of connections to the packet-oriented network LAN are possible from the external device H, further strategies may need to be implemented in order to implement a priority rule in the network node device ROU.

In addition to a transparent connection TC, communication with the external device H on the basis of "conventional" connections—i.e. effected with an address conversion and routing—is still possible for the network elements PC1, PC2, PC3 via the network node device ROU.

The schematic structure of the network node device ROU is explained in greater detail below with further references to the functional units shown in FIG. 1.

FIG. 2 shows a network node element ROU with a first network interface IF1 and a second network interface IF2. The first network interface IF1 (cf. FIG. 1) is connected to the network elements PC1, PC2, PC3 of the packet-oriented network LAN, and the second network interface IF2 could be connected with the modulation/demodulation device MOD. Furthermore, the two interfaces IF1, IF2 that are provided for bidirectional communication are largely identically configured.

The first and the second network interface IF1, IF2 of the network node device ROU are each connected to a respective interface transfer unit LI1, LI2. The interface transfer units LI1, LI2 are used for exchanging data packets from the network node device ROU, via the respective network interface IF1, IF2 and for transfer to additional internal units of the network node device ROU, said additional units being described below.

The first interface transfer unit LI1 is connected to a monitoring unit MON. The monitoring unit MON verifies the message header entries of exchanged data packets. Furthermore, the monitoring unit MON controls a first and a second bridging device BDP1, BDP2, which control the routing of the data packets within the network node device ROU.

If the monitoring unit MON detects that a data packet transferred via the interface transfer unit LI1 is a connection control element with a PPPoE message header entry, then this data packet is transferred by the monitoring unit MON to the first bridging device BDP1, via a route SC, to the second bridging device BDP2, which forwards the data packet to the interface transfer unit LI2 and finally to the network interface IF2. The aforementioned modification of the MAC addresses in the data packets is carried out in the monitoring unit MON or in one of the two bridging devices BDP1, BDP2. Alternatively, this exchange is carried out in a protocol unit (not shown).

If, however, no PPPoE message header entry is detected by the monitoring unit MON, then the data packet—including other functional units to be explained in greater detail below—is converted, inter alia, into a data packet according to the PPPoE protocol.

The data packet in question is then forwarded in turn to the first bridging device BDP1, from where—this time—it is forwarded to a routing unit IPR, as shown in the diagram by a vertical double-ended arrow. These are data packets for purely Internet Protocol-based ("pure IP") communication without PPPoE datagrams, for which address conversion of the IP address and possibly of the TCP (Transfer Control Protocol) port number is to be carried out. This address conversion is implemented in the aforementioned routing unit IPR, where a connection to the external device H has been set up beforehand. In an address conversion of this kind, the internet protocol message header entry of the IP datagram contained in the Ethernet data packet is processed, whereby an entry of the IP address and possibly of the TCP port number is modified accordingly in a data field of the IP message header entry.

The data packet is then transferred to a PPP converter unit PPP, in which the IP datagram is provided with a PPP data header entry.

The data packet is then transferred to a PPPoE converter unit, in which the analogous processing stage takes place with a PPPoE message header entry.

The data packet is then transferred to the second bridging device BDP2, which, under the control of the monitoring unit MON, initiates a transfer to the second interface transfer unit LI2. This unit finally transfers the data packet to the second network interface IF2.

Since communication is bidirectional, the data packets are also routed in the opposite direction. This takes place analogously to the procedure described above.

The invention claimed is:

1. A method for transparently exchanging data packets of a packet-oriented network by a network node device, the packet oriented network comprised of at least one network element connected to the network node device, each network element having a unique address within the packet-oriented network, the network node device utilizing the method comprising:
    setting up a connection between a first network element and an external device, the connection being set up such that the unique address of the first network element is converted to an address valid for the external device;
    verifying message header entries of data packets exchanged between the external device and the first network element;
    determining whether a message header entry characterizing an expanded packet-oriented protocol is within the message header entries;
    if the message header entry is determined to characterize an expanded packet-oriented protocol, establishing a temporarily transparent connection between the first network element and the external device, the unique address of the first network element that is valid for the external device being transferred to the external device without converting that unique address for a duration of the temporarily transparent connection.

2. The method according to claim 1, wherein the unique address of the first network element is assigned by the external device while the connection is set up between the first network element and the external device.

3. The method according to claim 2, wherein a modulation/demodulation device connects the external device to the network node device such that the network node device exchanges data packets of the packet-oriented network with the external device via the modulation/demodulation device.

4. The method according to claim 2, wherein a verification is carried out before the transparent connection for the first network element is set up to determine whether a transparent connection already exists for a least one other network element.

5. The method according to claim 2, wherein a maximum number of transparent connections is defined depending on a specification of the external device.

6. The method according to claim 1, wherein a modulation/demodulation device connects the external device to the network node device such that the network node device exchanges data packets of the packet-oriented network with the external device via the modulation/demodulation device.

7. The method according to claim 6, wherein a verification is carried out before the transparent connection for the first network element is set up to determine whether a transparent connection already exists for a least one other network element.

8. The method according to claim 1, wherein a verification is carried out before the transparent connection for the first network element is set up to determine whether a transparent connection already exists for a least one other network element.

9. The method according to claim 1, wherein a maximum number of transparent connections is defined depending on a specification of the external device.

10. The method according to claim 9 further comprising rejecting an establishment of the transparent connection if another network element already has a transparent connection established.

11. The method according to claim 9 further comprising cancelling an existing transparent connection and subsequently establishing a transparent connection between the external device and a second network element.

12. The method according to claim 1 further comprising terminating the transparent connection after a connection release request is detected.

13. The method according to claim 12, wherein the connection release request is triggered when no data packets have been exchanged according to the expanded packet-oriented protocol within a predefined time period.

14. The method according to claim 1, wherein the communication of the at least one network element with the network node device is effected according to Internet protocol or according to PPPoE communication protocol.

15. The method of claim 1 wherein the expanded packet-oriented protocol is PPPoE.

16. The method according to claim 1, wherein the at least one network element is comprised of a plurality of network elements and communication of the network elements is effected according to at least one of Internet protocol and PPPoE communication protocol.

17. A network node element for supporting a transparent exchange of data packets comprising: at least one first network interface to connect to a packet-oriented network; at least one second network interface to connect to an external device;
    at least one monitoring unit operatively connected to at least one of the at least one first network interface and the at least one second network interface, the at least one monitoring unit to establish a temporarily transparent connection between at least one network element of the packet-oriented network and the external device; and
    wherein the network node element does not convert a unique address of any network element that is allocated to that network element by the external device for a duration of a temporarily transparent connection established between that network element and the external device.

18. The network node element according to claim 17, wherein the network node element is a router.

19. The network node element according to claim 18, wherein the at least one monitoring unit controls at least one bridging device of the network node element.

20. The network node element according to claim 17, wherein the at least one monitoring unit controls at least one bridging device of the network node element.

21. The method of claim 17 wherein the expanded packet-oriented protocol is PPPoE.

22. The network node element according to claim 17 wherein the at least one second network interface is comprised of a modem connected to the network node element.

* * * * *